United States Patent [19]
Aman

[11] Patent Number: 4,877,338
[45] Date of Patent: Oct. 31, 1989

[54] GUIDE ARRANGEMENT IN A LINEAR POWER UNIT

[75] Inventor: Martin Aman, Skärholmen, Sweden

[73] Assignee: Linjär Transportteknik I Stockholm AB, Skärholmen, Sweden

[21] Appl. No.: 201,027

[22] Filed: Jun. 1, 1988

[30] Foreign Application Priority Data

Jun. 3, 1987 [SE] Sweden ............................ 8702317

[51] Int. Cl.4 .............................................. F16C 17/00
[52] U.S. Cl. ........................................ 384/26; 384/38
[58] Field of Search ..................... 384/32, 26, 38, 42, 384/37

[56] References Cited

U.S. PATENT DOCUMENTS 4,566,738  1/1986  Fasth ................................. 384/37 X
4,664,020  5/1987  Kaiser ................................. 92/88
4,702,621 10/1987  Heinonen et al. .............. 384/38 X

FOREIGN PATENT DOCUMENTS 2346633  4/1975  Fed. Rep. of Germany.

Primary Examiner—Thomas R. Hannon
Attorney, Agent, or Firm—Shapiro and Shapiro

[57] ABSTRACT

A guide arrangement in linear power units having a housing (1) and a slide (2) linearly movable relative to the housing, and is designed to relieve the slide of transverse forces, lateral forces etc., in order to reduce wear and eliminate jamming. According to the invention, this is achieved in that at least one guide rail (6) is arranged parallel to the direction of action of the linear power unit, that the housing (1) is fixedly connected to the guide rail (6), and that the slide (2) is hingedly connected in a manner to transmit push and pull forces only, to a guide device (7) guided on the guide rail (6).

12 Claims, 1 Drawing Sheet

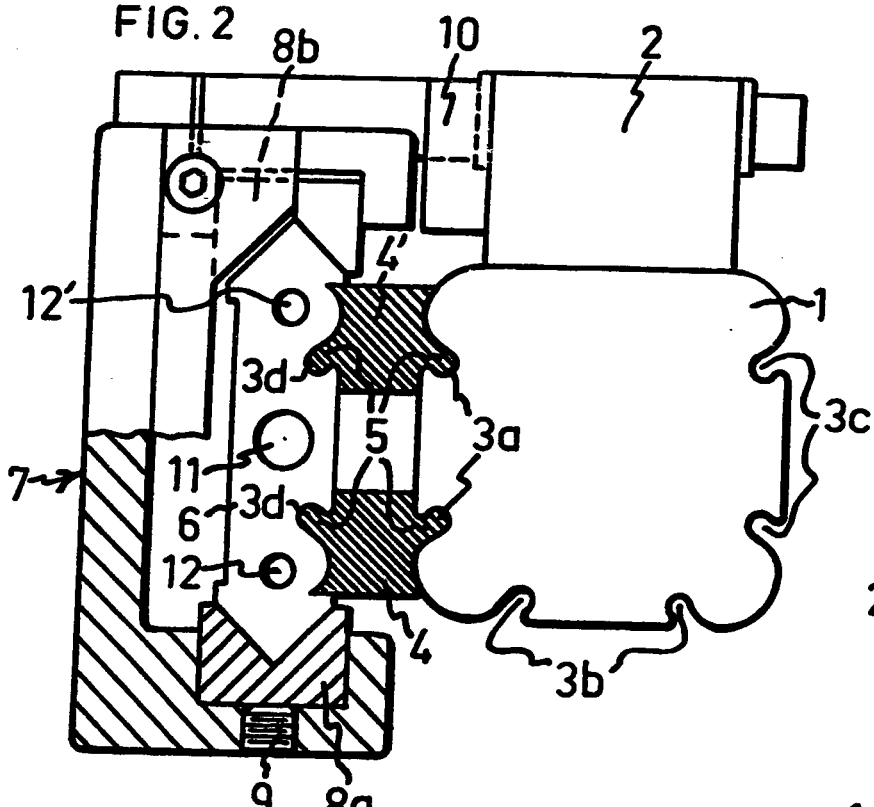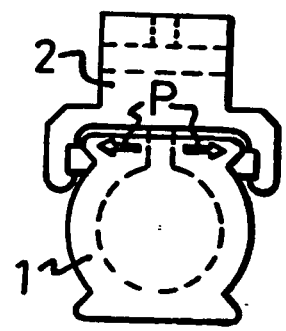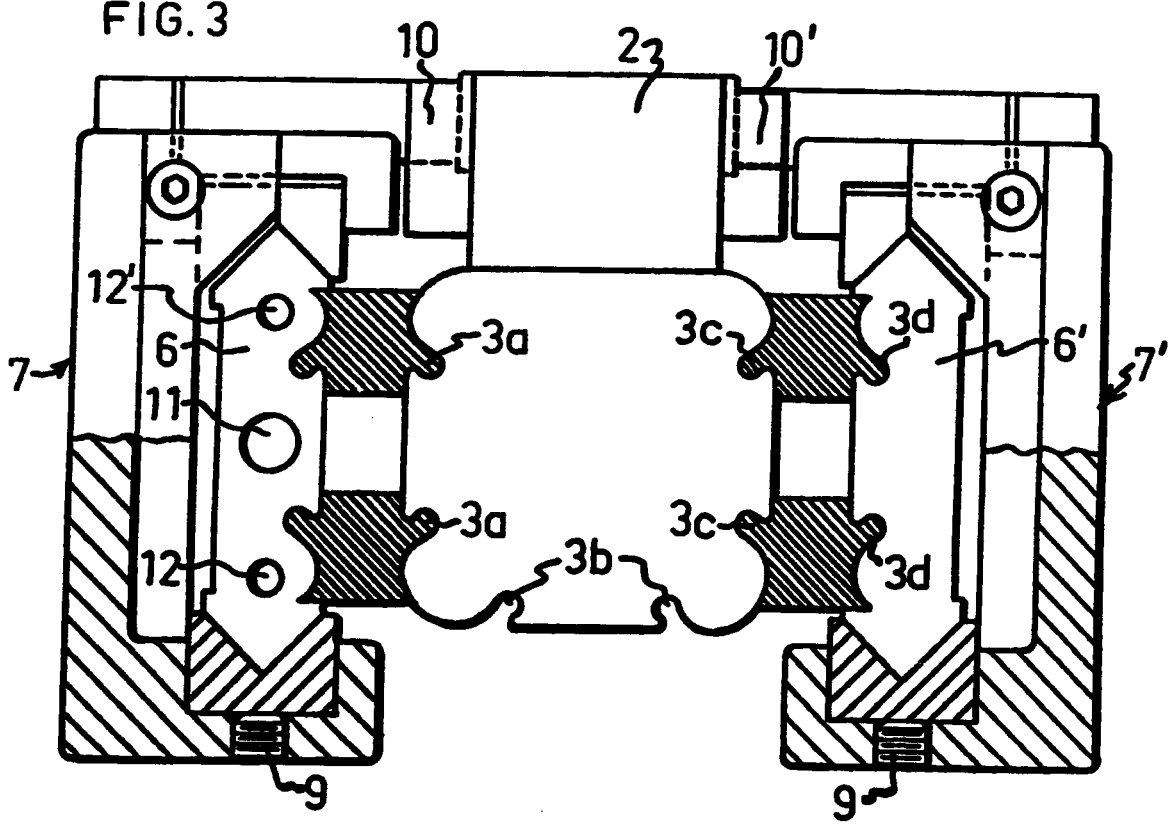

GUIDE ARRANGEMENT IN A LINEAR POWER UNIT

The invention relates to a guide arrangement in a linear power unit.

The term "linear power unit" as used herein relates to power units for producing linear movements, such as piston-rodless hydraulic, pneumatic or electrically powered cylinders, certain types of toothed belt drives, spindle assemblies, ball bearing screw assemblies etc. These linear power units typically have some type of a normally stationary housing or the like and some type of a normally movable runner or slide. Other movement patterns may also exist.

One problem inherent in prior art linear power units results from the fact that the power-transmitting attachment of the slide is subjected not only to the forces of displacement of the power source but also to other forces, e.g. lateral forces and other moments of load. The slide and its attachment, as well as the means transmitting the linear propelling force, should thus be dimensioned for a strength sufficient not only for the intended push and pull forces, but also for said additional loads and stresses. This normally means an increased width and thickness of the material.

However, in powered-cylinder type linear power units, for example, the housing cannot normally be completely closed but must have a slot of at least the above-mentioned increased width of the material and a length corresponding to the operating stroke length or exceeding it. Thus, an increase of the slot width means reduced rigidity of the housing.

It is previously known, e.g. through the company Mortonair, to provide a linear power unit in the form of a piston-rodless pneumatic cylinder and to form the cylinder with external guide grooves on opposite sides thereof for guiding a guide which is mechanically and rigidly connected to the slide (FIG. 1). Since the cylinder has a longitudinal slot, i.e. a generally U-shaped cross-section, high pressures in the cylinder may urge the U-legs (sides) of the cylinder slightly apart, whereby the guide will jam. Such jamming most often results both in reduced mobility of the slide and in increased wear of the guide grooves, with a consequential increase in play and impaired accuracy. The risk of jamming and wear becomes still greater if lateral forces acting on the guide also occur. Moreover, restoring worn guide grooves involves high costs since the cylinder part must then normally be replaced in its entirety. A further drawback of such an arrangement is that the guide grooves are exposed to deposits of dust etc., which may also increase wear. Further, the guide can only be applied on the same side of the cylinder as the slot.

One object of the present invention is to substantially reduce or eliminate the above-mentioned drawbacks. Another object is to relieve the slide of transverse and lateral forces and other moments of load. Also, the invention allows different mounting positions of the guide relative to the slide/power unit.

According to the invention, these objects are achieved by a guide arrangement in which a guide rail is fixedly connected to the power unit housing, a guide device is mounted for linear movement on the guide rail in the direction of the push/pull forces, and the slide is coupled to the guide device by means transmitting only the push/pull forces between the slide and the guide device. Further developments and special, preferred embodiments are described hereinafter.

The invention will now be described in more detail hereinbelow with reference to the accompanying drawings, in which:

FIG. 1 is a schematic view showing a known linear power unit;

FIG. 2 is a part-sectional axial view of a guide arrangement according to the invention in a piston and cylinder assembly with no piston rod; and FIG. 3 shows a double guide arrangement similar to that of FIG. 2.

FIG. 1 shows a known linear power unit, having a piston-rodless pressure-medium cylinder 1 in which a piston (now shown) is linearly movable back and forth. Such linear piston-cylinder assemblies are available, e.g. under the trademarks Origa, Martonair and others. On its outside, the cylinder housing 1 has four grooves parallel to the longitudinal axis of the cylinder. The two upper grooves in FIG. 1 cooperate, as shown, with a longitudinally displaceable guide device or slide 2 located above the cylinder. The slide 2 is rigidly connected to the piston in the cylinder by means of a piston attachment (not shown) extending through a longitudinal slot (seen between arrows P) in the top part of the cylinder wall 1. Arrangements of the type shown in FIG. 1 suffer from the drawback that the "cylinder legs" resulting from the slitting of the cylinder in its longitudinal direction tend, at high pressures in the interior of the cylinder, to move apart in the direction of the arrows P, with the consequences discussed earlier.

FIG. 2 shows an embodiment according to the invention. A pressure-medium cylinder 1 has an internal piston (not shown) connected to a piston attachment (slide) generally designated 2, which is movable along the cylinder. The cylinder housing, having a generally square cross-section and rounded corners, is provided on three of its four sides with respective pairs of longitudinal grooves 3a, 3b, 3c. The central planes (in the longitudinal direction of the cylinder) of the grooves are at angles to each other suitably ranging between 20° and 160°. Two strips 4, 4' each having a pair of profiled projections 5 are connected in a form-fitting and power-transmitting manner to the left-hand pair of grooves of the cylinder housing in FIG. 2, by insertion of the right-hand projections 5 of the strips 4, 4' in respective ones of the grooves 3a, whereupon screws may be passed through bores (not shown in FIG. 2) provided in one of the strips parallel to the plane of the drawing, screwed into respective threaded holes provided in the other strip 4 in alignment with said bore, and tightened. Since the cylinder, piston, slide, cylinder grooves, strips and profiled projections are prior art, these components will not be described in more detail here.

However, before the above-mentioned tightening is effected, a guide rail 6, provided with a similar pair of grooves 3d as the cylinder housing 1, is fitted, in accordance with the inventive concept, to the left-hand projections 5 of the strips 4, 4'. The dimensions of the guide rail 6 can be selected with regard both to the expected loads and stresses exerted by the linear power unit 1,2 and to the loads to be displaced or supported/taken up by the linear power unit.

The guide rail 6 cooperates with a guide device 7 which, by lower and upper guide members 8a and 8b, respectively, is displaceable on the guide rail. The lower guide member or members 8a in FIG. 2 are each suitably provided with a position-adjusting device 9, here a set screw 9, for adjusting the play/clearance between the guide rail 6 and the guide members 8a, 8b of the guide device 7. The guide members are suitably exchangeable so that they can be replaced at a low cost when worn.

At its upper right-hand portion, the guide device 7 is connected to the slide (piston attachment) 2 by means of a coupling 10.

In accordance with the present invention, the coupling 10 should have the property of only transmitting push and pull forces between the piston attachment and the guide device, but not lateral forces, transverse forces, torque or other similar possibly deforming stresses. Suitable such couplings are known in various designs and, for the purposes of the present invention, may be selected through the exercise of routine skill in view of the above-mentioned and other desirable properties. By means of such a coupling, the cylinder will be relieved of a substantial part of the loads or stresses otherwise applied to it or, in other words, the cylinder 1 is stiffened by the guide rail 6 and the guide device 7 in such a manner that the stresses are instead taken up by the guide rail mounted together with the guide device (slide) on the cylinder housing.

This means that it is now possible, thanks to the invention, to choose a power unit, i.e. in this case the cylinder 1, only on the basis of the required push and pull forces whilst, when earlier choosing the power unit, it was necessary to pay regard also to other stresses, which has always resulted in the use of cylinders of increased diameters and, thus, higher costs and also higher consumption of pressure medium.

A smaller cylinder stabilized by means of a guide rail according to the invention will, however, almost always be less expensive than an equally stable, larger cylinder.

As appears from FIG. 3, a cylinder according to FIG. 2 can also be provided with two guide rails 6, 6' or, in an analogous manner, though not shown in the drawing, even with three guide rails. The different guide rails may each have one guide device 7,7', as shown in FIG. 3, or all cooperate with a single guide device engaging one or more of the three guide rails. Further, the third guide rail may have no guide device and, for instance, then only serves as a rail for additionally stiffening the housing 1 of the power unit.

Further, the guide device may in a known manner embrace one or more guide rails and, optionally together with bellows or the like, protect the slide surfaces from deposits, contaminants, such as dust, splashing etc., thus increasing the life of the slide surfaces.

Of course, the guide rails 6 can also be connected to the cylinder housing 1 other than by means of the above-mentioned strips 4, e.g. to the end walls of the cylinder.

It is readily understood that the guide devices will not jam on the guide rails by the U-legs of the cylinders being slightly urged apart by the forces indicated by the arrows P in FIG. 1, since any such parting movement will be executed by both the guide rail and the guide device.

As further appears from FIG. 2, the guide rail 6 may be provided with a pressure-medium channel 11. At one end, the channel 11 can be connected to one cylinder chamber located at said end, which means that the connection of both cylinder chambers to a pressure-medium source can be provided at one and the same cylinder end.

Further, the guide rail 6 may be provided with additional channels 12, 12' for connecting e.g. hydraulic or pneumatic position-sensing devices for selected positions of displacement. Such a position-sensing device may consist e.g. of a valve and a cam provided in said selected position of displacement. In this case, the valve is fixed to the guide device 7. When the guide device with the valve passes the cam, the valve is opened or closed, whereby the supply or discharge of pressure medium can be opened or closed, respectively, for connection, via said channels 12, 12', to means operated by the position-sensing device. Of course, it is also possible in the channels 12, 12' to insert insulating conductors and connect them to corresponding electric sensing means.

When using more than one guide rail 6, 6' (FIG. 3), only one guide rail 6 may be provided with said channels 11, 12, 12'. Of course, it is also possible to use the alternative of arranging the pressure-medium channel 11 in one guide rail 6 and the channels 12, 12' in the other guide rail 6'.

I claim:

1. A power unit, comprising a cylinder housing, a piston disposed in said housing and linearly movable relative to said housing for producing push/pull forces in the direction of relative movement, a slide disposed externally of said housing and connected to said piston through a slot in said housing for movement with said piston relative to said housing, a linear guide rail fixedly connected to said housing and extending in said direction of relative movement, a guide device mounted on said guide rail and guided by said guide rail in said direction of relative movement, and means coupling said slide to said guide device in such a manner as not to transmit force components directed laterally of said direction of relative movement, between said guide device and said slide.

2. A power unit according to claim 1, wherein said housing and said guide rail are each provided with a pair of obliquely directed profiled grooves, the respective grooves of each pair being disposed at an angle of from 20° to 160° to each other, and further comprising a pair of connecting strips connecting said housing to said guide rail, each connecting strip having a pair of profiled projections corresponding to and fitted into a respective one groove of each groove pair.

3. A power unit according to claim 1, wherein said guide rail has means defining a longitudinal channel therein for supplying a fluid pressure medium to a cylinder chamber at one end of said cylinder housing.

4. A power unit according to claim 3, wherein said guide rail has means defining at least one additional channel for connecting fluid-type sensing means for sensing selected positions of said slide.

5. A power unit according to claim 1, wherein said guide device includes replaceable guide bearings engaged with said guide rail.

6. A power unit according to claim 5, wherein said guide device includes means for adjusting play of at least one of said guide bearings.

7. A power unit according to claim 1, further comprising an additional guide rail fixedly connected to said cylinder housing and extending in said direction of relative movement, an additional guide device mounted on said additional guide rail and guided by said additional guide rail in said direction of relative movement, and means coupling said slide to said additional guide device in such a manner as to transmit forces only in said direction of relative movement between said additional guide device and said slide.

8. A power unit according to claim 1, wherein said guide rail is fixed to opposite end portions of said cylinder housing.

9. A power unit according to claim 1, wherein said guide device embraces said guide rail.

10. A power unit according to claim 1, wherein said coupling means comprises a coupling which transmits said push/pull forces, but not lateral or transverse forces, torque, or other possibly deforming stresses.

11. A power unit, comprising a hollow housing, a power source disposed in said housing and linearly moveable relative to said housing for producing push/pull forces in the direction of relative movement, a slide disposed externally of said housing and connected to said power source through a slot in said housing for movement with said power source relative to said housing, a linear guide rail fixedly connected to said housing and extending in said direction of relative movement, a guide device mounted on said guide rail and guided by said guide rail in said direction of relative movement, and means coupling said slide to said guide rail in such a manner as not to transmit force components directed laterally of said direction of relative movement, between said guide device and said slide.

12. A power unit, comprising a hollow housing, a power source disposed in said housing for relative movement longitudinally of said housing for producing push/pull forces longitudinally of said housing, a slide connected to said power source through a slot in said housing for movement with said power source relative to said housing, a guide rail fixedly connected to said housing and extending parallel to the path of said relative movement, a guide device mounted on said guide rail and guided by said guide rail along said path of relative movement, and means coupling said slide to said guide rail in such a manner as not to transmit force components directed laterally of the direction of movement of said slide relative to said housing, between said slide and said guide device.

* * * * *